United States Patent Office 2,999,030
Patented Sept. 5, 1961

2,999,030
WATER RESISTANT ADHESIVE AND PROCESS FOR PREPARING SAME
Helmut Roederer, Hamburg-Volksdorf, and Walter Zinke, Hamburg-Berne, Germany, assignors to Corn Products Company, a corporation of Delaware
No Drawing. Filed June 4, 1958, Ser. No. 739,697
Claims priority, application Germany June 5, 1957
11 Claims. (Cl. 106—210)

For applying labels on beer, wine, champagne and other bottles, an adhesive is necessary, which, without drying, will afford good adhesion of the labels, so that on further transport of the bottles on the automatic machines the labels do not become detached from the bottles. It is also necessary that such an adhesive adhere well to wet, cold bottles.

These adhesive qualities are provided by certain dextrine and animal adhesives. Also, suitable are relatively highly concentrated starch adhesives, the viscosity of which has been reduced by such a chemical modification of the starch molecules, that sufficiently high concentrations can be produced. These adhesives, however, have the disadvantage of being readily soluble in water, even after drying, and thus the labels which are applied with such adhesives, easily come detached when, for example, the bottles are put into cold water for the purpose of cooling the contents thereof. By adding certain synthetic resins, such as certain urea-formaldehyde-resin-precondensates, the water resistance of these adhesives can be improved. However, the addition of such resins limits considerably the shelf life of the resulting adhesives. Combinations of dextrine adhesives with animal glues also have a limited resistance to water, but it is not sufficient in all cases to prevent the labels from being detached when the bottles are placed in cold water. Frequent attempts have been made to glue the labels with pure synthetic adhesives. Such products, however, have the disadvantage that they do not adhere very well to wet bottles, while after drying, such adhesives are so water resistant that the labels can not be removed in the usual bottle-rinsing machines.

Frequently, it has been suggested that substances such as enzymes, acids and oxidizing agents, be added to the starch which chemically modify the starch during gelatinization. While highly concentrated starch gels can thus be produced, these gels have little or no water resistant adhesive qualities.

The present invention overcomes the foregoing disadvantages.

In accordance with the present invention, there is provided a process for preparing a water resistant adhesive for labels which comprises slowly adding to an aqueous slurry of gelatinized starch, a concentrated slurry of ungelatinized starch while heating and rapidly agitating said starches to gelatinize the ungelatinized starch.

This invention also provides a water resistant adhesive comprising a gelatinized starch whose swollen granules have been mechanically disintegrated during gelatinizing action.

It has been found that a gelatinized starch, the swollen granules of which have been extensively disintegrated by mechanical means during the gelatinization, is an excellent water resistant adhesive, particularly for bottle labels. Suitable mechanical means, which should have a vigorous agitating effect, are for example, vigorous, rapidly operating agitators, kneading machines and homogenizing machines. The same result can be achieved by spraying the starch through nozzles. The preferred operating temperature is between 50 and 100° C. The time required for achieving the desired effect depends upon the concentration of the gel, the higher the concentration the shorter the time required. It is preferred to disintegrate completely the swollen starch granules so that even under the phase-contrast microscope, no starch granule skins are visible. Starch adhesives produced in this way, can very well be used on the usual labeling machines, even with concentrations, for example, of from 20 to 35%. The consistency can be improved considerably, if the adhesives are treated in a homogenizer or are homogenized on rollers.

The process is best carried out by first gelatinizing a relatively dilute aqueous slurry of ungelatinized starch by heating and agitating the same in the usual manner, and then gradually adding a concentrated slurry of ungelatinized starch with further agitation and heating to gelatinize the ungelatinized starch. In this way, adhesives having a concentration about 5 times higher than usual are obtained which have excellent water-resistant qualities.

Further, it has been found that the water resistance of the adhesive bond largely depends on the kind of starch used in the process of this invention, and that, for instance, corn starch results in a good water resistant adhesive while normal potato starch, without the addition of formaldehyde products or other so-called hardeners, does not yield a water resistant adhesive. It has been determined that, above all, good water resistant adhesives can be obtained from starches which show the so-called pudding effect, or which show an A-diagram in the roentgenographic test while starches with a B-diagram result in adhesives with poor water resistance. Examples of starches which may be used in the practice of this invention include corn, milo, wheat, rye and rice starches.

A potato starch which may be used in our invention is that prepared as known in the prior art, for example, in accordance with the German Patent No. 856,260 covering the treatment of a potato starch with an excess of alkaline hypochlorite at temperatures below the gelatinization point, neutralizing and drying the resulting product to form a tasteless pudding. The product obtained from this German patent must be additionally treated to change its roentgendiagram from a B-diagram into an A-diagram, such as by heating in a damp atmosphere.

After cooling a corn starch that has been gelatinized under normal conditions, i.e., without vigorous agitation and at concentrations of more than 7 to 8%, a hard pudding results which cannot be applied as an adhesive.

According to the present invention, however, by using the same corn starch up to concentrations of about 35%, easily applicable adhesives are obtained, which are especially suitable for affixing labels on wet bottles.

During or after preparation of the adhesives of this invention, small quantities of alkaline materials, such as alkalis, ammonia, or alkaline soaps, plasticizers, such as sorbitol, dextrose, saccharose, starch syrup, urea or inorganic salts, emulsifiers, such as fatty alcohol sulfonate or lecithin, and preservatives, can be added to the adhesives.

The following examples merely serve to illustrate the invention and should not be construed as limiting the scope thereof.

Example 1

0.8 kg. of corn starch in 7 liters water was gelatinized at about 80° C. with rapid agitation using a propeller agitator at about 1400 revolutions per minute. A starch slurry consisting of 6.5 liters of water and 3.2 kg. of corn starch was added slowly to the reaction mixture with further heating and agitation. After gelatinization, the mixture was cooled with agitation. At about 50° C., 0.85 kg. of starch syrup (45° Bé.) and 0.5 liter of formalin (40%) were added. The concentration was tested with a sugar refractometer and found to have a value of about 31 to 33%.

The adhesive thus obtained was found to be particularly suitable as a so-called ice-proof label adhesive, as well as for use as a waterproof adhesive for papers, e.g., laminating paper on paper, gluing of bags, paper sacks, etc., and for affixing metal foil on paper, e.g., laminating aluminum foil on paper, etc.

*Example 2*

1.1 kg. of wheat starch in 10 liters of water were gelatinized at 80° C. with rapid agitation. A starch slurry consisting of 7 liters water and 3.5 kg. of wheat starch was slowly added to the reaction mixture with further heating and agitation. After complete gelatinization, the mixture was cooled with agitation, and 1 kg. of starch syrup (45° Bé.), 0.7 liter of formalin (40%) and 0.1 kg. of lecithin were added.

The adhesive thus obtained was found suitable for the same uses as the adhesive prepared by the procedure of Example 1.

*Example 3*

1.5 kg. of milo starch in 14 liters of water were gelatinized with rapid agitation at about 80° C. 14 liters of water and 7 kg. milo starch were slowly added to the reaction mixture with further heating and agitation. After the starch paste was completely gelatinized, it was cooled with rapid agitation, and then 2 kg. of corn syrup (45° Bé.), 1 liter of formalin (40%), and 0.5 kg. of sodium stearate were added.

The adhesive thus obtained was found suitable for the same uses as the adhesive prepared by the procedure of Example 1.

We claim:

1. Process for the production of a water-resistant adhesive for labels which comprises slowly adding to an aqueous slurry of gelatinized starch, a concentrated slurry of ungelatinized starch while heating and rapidly agitating said starches to gelatinize the ungelatinized starch; the final starch content being within the range of about 20 to about 35 percent, dry basis said starches being selected from those which show an A diagram in the roentgenographic test.

2. Process in accordance with claim 1, wherein the ungelatinized starch is a potato starch first treated under non-gelatinizing conditions which an excess of alkaline hypochlorite, neutralized, dried and then heated in a damp atmosphere to change its roentgendiagram from a B-diagram to an A-diagram.

3. Process in accordance with claim 1, wherein a water soluble starch syrup plasticizer is added during some stage of the process.

4. Process in accordance with claim 1, wherein a lecithin emulsifier is added during some stage of the process.

5. Water-resistant adhesive made in accordance with the process of claim 1.

6. Process according to claim 1 wherein about 4.5 to 6.0 percent of formaldehyde, dry basis, is added to the finished adhesive.

7. Process in accordance with claim 1 wherein said starch is corn starch.

8. Process in accordance with claim 1 wherein said starch is milo starch.

9. Process in accordance with claim 1 wherein said starch is wheat starch.

10. Process in accordance with claim 1 wherein said starch is rye starch.

11. Process in accordance with claim 1 wherein said starch is rice starch.

References Cited in the file of this patent

UNITED STATES PATENTS

| | | |
|---|---|---|
| 1,157,738 | Tyler | Oct. 26, 1915 |
| 1,253,397 | Lenders | Jan. 15, 1918 |
| 1,418,274 | Benjamin | June 6, 1922 |
| 2,102,937 | Bauer | Dec. 21, 1937 |
| 2,258,741 | Champion et al. | Oct. 14, 1941 |
| 2,563,661 | Rood | Aug. 7, 1951 |